April 16, 1963  J. U. EYNON  3,086,169
SYSTEMS FOR MEASURING ELECTROLYTIC CONDUCTIVITY
Filed Jan. 15, 1960  2 Sheets-Sheet 1

April 16, 1963   J. U. EYNON   3,086,169
SYSTEMS FOR MEASURING ELECTROLYTIC CONDUCTIVITY
Filed Jan. 15, 1960   2 Sheets-Sheet 2

United States Patent Office 3,086,169
Patented Apr. 16, 1963

3,086,169
SYSTEMS FOR MEASURING ELECTROLYTIC
CONDUCTIVITY
James U. Eynon, Willow Grove, Pa., assignor to Leeds
and Northrup Company, Philadelphia, Pa., a corporation of Pennsylvania
Filed Jan. 15, 1960, Ser. No. 2,616
7 Claims. (Cl. 324—30)

This invention relates to systems for measuring the electrolytic conductivity of solutions and more particularly relates to systems suited for monitoring the purity of effluent water in an ion-exchange system so to serve as a guide in regeneration of the ion-exchange unit.

In accordance with a preferred form of the present invention, the monitoring system includes a voltage-regulating power transformer which applies a constant alternating voltage across the series-combination of a conductivity cell, traversed by the solution under measurement, and resistance means which is adjusted, manually or automatically, in accordance with the temperature of the solution. The resulting alternating-voltage drop across the resistance means is applied by a signal transformer to a balanced demodulator network to which is also applied a synchronizing voltage of the same frequency. The direct-current output voltage of the demodulator network which varies as a non-linear temperature-compensated function of the cell conductance is applied to a metering circuit including a direct-current deflection instrument which continuously indicates the conductivity of the solution and/or initiates an alarm when a preselected conductivity is reached. The measuring circuit also includes a series-calibrating resistance adjustable to vary the ratio of the direct current therein to the alternating current traversing the conductivity cell to minimize the difference between the indicated conductance and the actual conductance throughout the range of measurement or a selected portion thereof.

The invention further resides in an electrical measuring system having novel and useful features of composition and arrangement herein described and claimed.

For a more detailed understanding of the invention, reference is made to the following description of preferred embodiments thereof and to the attached drawings in which:

FIG. 1 schematically illustrates a system for measuring the conductivity of a solution;

FIG. 2 schematically illustrates a modification of part of the system of FIG. 1;

Figures 1, 2:
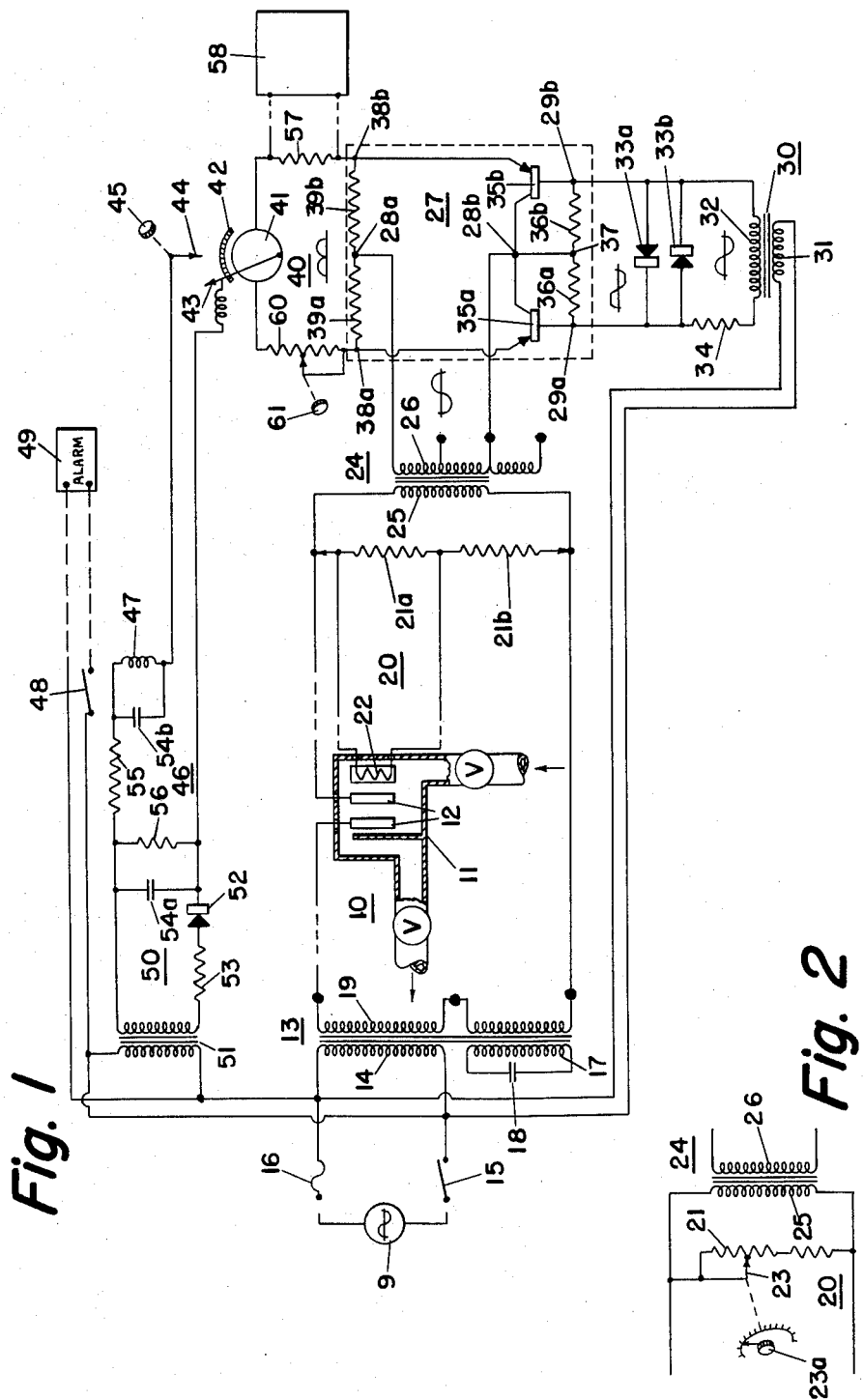
Figure 4:
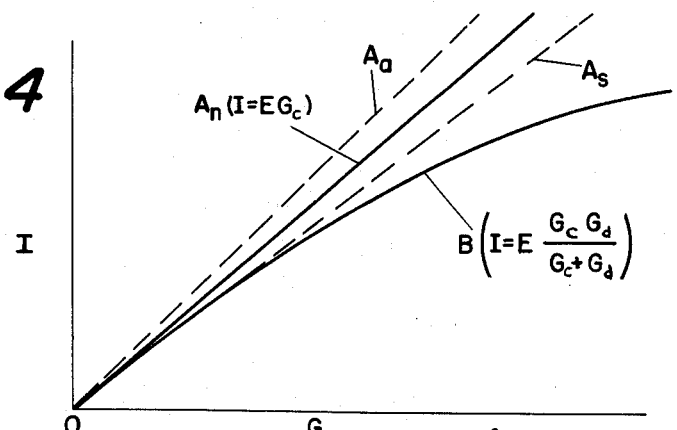
FIGS. 4 and 5 are explanatory figures referred to in discussion of such system.

Referring to FIG. 1, the solution under measurement is passed into the conductivity cell 10 comprising a housing 11 and a pair of electrodes 12 suitably electrically insulated from each other—and also from the housing 11 when the latter is of conductive material. The areas of the submerged electrodes and the spacing between them are fixed so that assuming a constant voltage is applied to the cell and that the circuit includes no resistance other than that of the solution in the cell, the relationship between the cell current and the conductance of the cell as exemplified by curve $A_n$ of FIG. 4 is strictly a linear one from zero conductance to infinite conductance for any constant temperature $T_n$ of the solution. At any higher temperature $T_a$, a linearity of the relationship still obtains but the curve, as exemplified by curve $A_a$, is of greater slope: at any lower temperature $T_s$, linearity of the relationship also obtains but the curve, as exemplified by curve $A_s$, is of lesser slope. Such linear relationship, for any constant solution temperature, may be expressed as (1) $$I = EG_c$$

where:

$I$ = cell current
$E$ = applied voltage
$G_c$ = cell conductance

The transformer 13 for effecting flow of current through cell 10 is of suitable voltage-regulating type. Its primary winding 14 is connected through switch 15 and fuse 16 to a source of alternating voltage 9, such as the usual 110-volt, 60-cycle line commonly available for lighting and power purposes and subject to fluctuations of voltage and frequency. The regulating winding 17 and its associated capacitor 18 insures that the output voltage of secondary winding 19 remains substantially constant, for example, to within ±1% for line voltage variations of ±15% and to within ±0.25% for frequency variations of ±0.1 cycle per second.

The output voltage of transformer 13 is applied to the conductivity cell 10 in series with resistance means 20. In the system of FIG. 1, the resistance means 20 comprises the resistors 21A, 21B which have negligible temperature coefficient of resistance and resistor 22, such as a thermistor, which has a substantial negative temperature coefficient of resistance. The resistor 22 is subjected to the same temperature changes as the solution under measurement, and to such end may be disposed within the cell 10 in good heat-transfer relation to the solution but electrically isolated therefrom. The relative magnitudes of the resistors 21A, 21B and 22 are so chosen for a preselected range of cell conductance that their effective conductance in series with the cell 10 is automatically varied in compensation for the effect of temperature upon the cell conductance. With the resistance means 20 in circuit, the relationship between cell-current and cell-conductance is no longer the linear one expressed by Equation 1 but a non-linear one exemplified by curve B of FIG. 4 and which may be expressed as (2) $$I = E \frac{G_c G_d}{G_c + G_d}$$

where:

$I$ = cell current
$E$ = applied voltage
$G_c$ = cell conductance
$G_d$ = conductance of resistance means 20

In the modification shown in FIG. 2, the resistance means 20 is manually adjustable in accordance with the temperature of the solution in cell 10. Specifically, the resistance means 20 includes a rheostat 21 which replaces the resistors 21A, 21B and 22 of FIG 1, and is provided with a contact 23 adjustable by knob 23A associated with a calibrated temperature scale.

Electrolytes exhibit a relatively large change in conductance with temperature; approximately 2% for 1° C. change in temperature. For example, water having a conductance of 100 micromhos at 25° C. has a conductance of 383 micromhos at 100° C. and a conductance of 58.9 micromhos at 0° C. In a typical system suited for measuring conductance through a range of from 0 to 100 micromhos and for direct-reading of the conductance value at 25° C. for any temperature in the range of 0° to 100° C., the table below shows the relationship between the setting of knob 23A of the solution-temperature scale and the corresponding value of resistance means 20.

| Solution temperature, ° C.: | Resistance 21 in ohms |
|---|---|
| 0 | 360 |
| 10 | 277 |
| 20 | 206 |
| 25 | 175 |
| 30 | 151 |
| 40 | 121 |
| 50 | 102 |
| 60 | 87.4 |
| 70 | 73.3 |
| 80 | 61.1 |
| 90 | 50.6 |
| 100 | 38.8 |

For automatic compensation in such system, the same table is used for determining the values of the resistors 21A, 21B, 22 of the thermistor network 20 of FIG. 1. With the resistance means 20 automatically or manually set to the proper value for the existing solution temperature, the relationship between cell-current and cell-conductance is a fixed non-linear one such as exemplified by curve B (FIG. 4) rather than a family of linear curves (including curves $A_n$, $A_a$, $A_s$) each of different slope for each different temperature.

Whether the resistance means 20 be of the manually adjusted type, as in FIG. 2, or of the automatically adjusted type, as in FIG. 1, the alternating voltage drop across it, due to the cell-current, is impressed upon the primary winding 25 of a signal transformer 24 whose secondary winding 26 is connected to one pair of input terminals 28A, 28B of a demodulator network 27. Another pair of input terminals 29A, 29B of network 27 is connected to the secondary winding 32 of a step-down power transformer 30 whose primary winding is connected to the A.C. power source 9.

The sine-wave output of secondary winding 32 of transformer 30 is converted into flat-topped switching pulses of alternating polarity by the paralleled reversely-poled clipper diodes 33A, 33B and the series-drop resistor 34. As applied to the input terminals 29A, 29B of demodulator 27, these pulses serve as a synchronizing voltage having the same frequency as the A.C. output of the signal transformer 24. The input terminals 29A, 29B of the demodulator 27 are respectively connected to the base electrodes of the transistors 35A, 35B and to the end terminals of bias resistors 36A, 36B. The common terminal 37 of these resistors is connected to the collector electrodes of the two transistors and to the signal input terminal 28B of the demodulator. The emitter electrodes of the transistors 35A, 35B are respectively connected to the end terminals 38A, 38B of load resistors 39A, 39B whose common terminal is connected to or serves as the other signal input terminal 28A of demodulator 27.

The transistors 35A, 35B are of the PNP type such as GT 763 germanium transistors. They are each alternately biased to the conductive state and to the non-conductive state—one being conductive while the other is non-conductive—by the switching-current pulses flowing through the biasing resistors 36A, 36B from the synchronizing source including transformer 30 and the clipper diodes. When transistor 35A is conductive, one halfwave of the output voltage of the signal transformer 24 causes current to flow through load resistor 39A from output terminal 38A to input terminal 28A. When transistor 35B is conductive, the opposite sign halfwave of the output voltage of signal transformer 24 causes current to flow through the other load resistor 39B from input terminal 28A to output terminal 38B.

There is thus produced between the output terminals 38A, 38B of demodulator 27 a direct-current voltage whose magnitude varies as a non-linear temperature-compensated function of the conductance of cell 10. Although transistors are not perfect switching devices, in the balanced demodulator 27 shown and described, the zero offset of one transistor may be quite completely compensated by the zero offset of the other transistor.

With the transistor demodulator 27, the direct-current output voltage appearing at terminals 38A, 38B is of magnitude which varies linearly with respect to the temperature-compensated voltage produced across resistance means 20 by the flow of cell-current, i.e., the demodulator output voltage is an accurate, undistorted reproduction of the non-linear temperature-compensated function of cell-conductance appearing as an A.C. voltage across the resistance means 20. At the low input levels here involved and with an isolating transformer 24 interposed between the cell-circuit and the measuring circuit, such linearity would not be attained with diode rectifiers. The conversion to direct current by the transistor demodulator 27 also avoids the problems of loss of contact adjustment, contact closure time variation and like malfunctioning often encountered with mechanical rectifiers.

Suitable circuit values with an output of 3.15 volts from transformer 30 are:

| | Ohms |
|---|---|
| Resistor 34 | 1650 |
| Resistor 36A | 1000 |
| Resistor 36B | 1000 |
| Resistor 39A | 1000 |
| Resistor 39B | 1000 |

Figure 3:
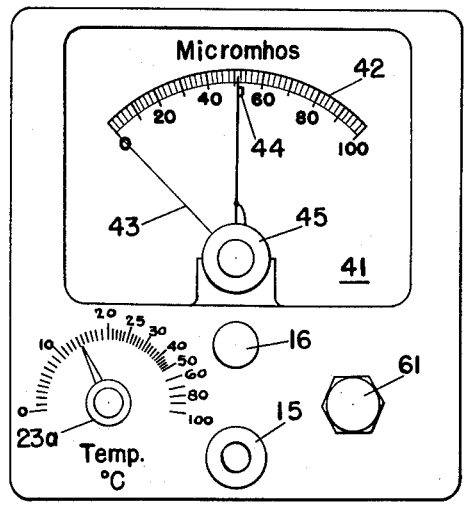
FIG. 3 is a front elevational view of a measuring unit.

The direct-current voltage appearing between the output terminals 38A, 38B of the demodulator is applied to a measuring circuit 40 including the microammeter 41 having a pointer 43 movable with respect to scale 42. As shown in FIG. 3, the scale may be linearly calibrated in micromhos for direct reading of the solution conductivity within a preselected range. The meter 41 may be replaced by, or serve as, a sensitive relay for controlling actuation of an alarm when the solution conductivity attains a critical value. To that end, the meter 41 may be provided with an alarm contact 44 which may be preset by knob 45 (FIG. 3) with respect to scale 42. When the pointer 43 engages contact 44, it energizes an alarm system including relay 47 whose contact 48 thereupon closes to effect energization of the alarm bell 49 or equivalent from the power source 9.

The alarm relay 47 may be a direct-current relay energized from power source 9 by a power supply including transformer 51, rectifier 52, protective resistor 53, a bleeder resistor 56 and a filter including capacitors 54A, 54B and resistor 55. The alarm relay 46 including relay 47 and its power supply may be a plug-in unit for mounting on the same chassis as the transformers 13, 24, 30, the demodulator 27 and the metering circuit 40 including its components.

In permanent installations, this single chassis may be panel-mounted: to put the unit in operation requires only external connections to power source 9, to the conductivity cell 10 and to the alarm device 49. For portable use, such chassis, usually without the plug-in alarm, may be enclosed in a small carrying case. To put this portable unit into operation requires only external connections to power source 9 and to a conductivity cell 10. All manual controls are mounted on the front panel of the unit (FIG. 3).

Reverting to FIG. 1, the measuring circuit 40 includes in series with meter 41 a fixed coupling resistor 57 for connection to the input terminals of an external recorder or controller 58 which may be of any suitable type, such as shown for example in U.S. Letters Patent 2,113,164. There is produced across resistor 57 a direct-current voltage which is proportional to the meter current and so may be utilized for continuously recording or controlling the conductivity of the solution traversing the cell 10.

With the temperature-compensation effected by resistance means 20 in the input circuit of the demodulator, it is effectively concurrently applied to the meter 41, to the alarm circuit setting and to the recorder 58 so avoiding need to shift the scale of meter 41, to shift the setting of alarm contact 44 and the resistance value of coupling resistor 57.

Figure 5:
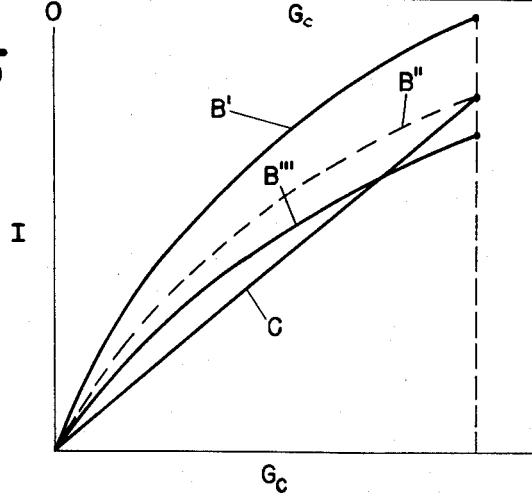

The measuring circuit 40 also includes in series with meter 41 a calibrating resistor 60 adjustable by knob 61 to vary the ratio between the direct current flowing in the measuring circuit 40 and the alternating current traversing the cell 10 and resistance means 20. With the ratio adjusted so that there is coincidence near the zero end of scale 42 between the indicated value of cell conductance and the actual conductance as compensated for temperature, the measurement error increases with increase of conductance and is a maximum at full scale (see curve B' of FIG. 5). With this ratio adjusted by resistor 60 to effect coincidence of indicated and actual conductance at full scale, the maximum error is smaller and occurs near mid-scale (see curve B'' of FIG. 5). With this ratio adjusted to effect coincidence of indicated and actual values at about 80% of full scale (curve B''' of FIG. 5), the maximum error throughout the range of measurement is much reduced in magnitude and changes sign at the coincidence point which is now a cross-over point. Such ratio is best suited for most applications. When, however, the conductance of the solution is to be controlled to maintain a critical value, the ratio of meter-current to cell-current is adjusted by the calibrating resistor 60 so that the error cross-over point occurs at that critical value. Thus, the measurement error is zero at the critical value and is negligible for small excursions to higher or lower values.

In the specific typical systems of Table I (later referred to), calibrating rheostat 60 has a maximum value of 450 ohms, the resistance of meter 41 (a 100 microampere meter) is 1000 ohms, and the coupling resistor 57 is 100 ohms.

For a given meter 41, the maximum conductance that can be measured depends upon the output voltage (E) of power transformer 13, the primary to secondary turns ratio ($a$) of the signal transformer 24, and the effective value of resistance means 20. As shown in Table I below, by changing only one or more of these parameters, there may be obtained four decade ranges covering a total range of from 0 to 10,000 micromhos.

Table I

| Cell Conductance Range at 25° C. (reference temp.), micromhos | E, volts | $a$ | Resistance 20 | |
|---|---|---|---|---|
| | | | at 25° C., ohms | from 0° C. to 100° C., ohms |
| 0-10 | 38 | 2.92 | 2,855 | 1 495-2,855 |
| 0-100 | 18 | 1 | 175 | 38.3-360 |
| 0-1,000 | 18 | 1 | 14.35 | 5.02-27.4 |
| 0-10,000 | 1.8 | 0.476 | 7.33 | 1.87-13.0 |

1 25° C. to 100° C.

With a cell constant of 1, the values of column 1 of Table I give the ranges of specific conductance. For any given cell-conductance range, it is feasible to obtain other specific conductance ranges by using conductance cells having cell constants greater or lesser than 1 in which case the meter reading is multiplied by the cell constant. For all of these ranges, the calibrating resistance 60 may be set as above described to minimize the maximum error of the range. As will be noted from the table, two of these ranges require no change other than the resistance means 20. The other two additionally require change in the effective turns ratios of the transformers 13 and 24. This can be effected by substitution of transformers, by changing the connections to tapped windings, or changing the interconnections of multiple windings.

What is claimed is:

1. A system for measuring the conductivity of a liquid comprising a conductivity cell, resistance means, a voltage-regulating power transformer having a primary winding for connection to an alternating-current source and a secondary winding connected to apply its constant alternating output voltage to said conductivity cell and said resistance means in series, a demodulator having two input circuits and an output circuit, a signal transformer having a primary winding connected across said resistance means and a secondary winding connected to one of said input circuits of said demodulator, a second power transformer having a primary winding for connection to said alternating-current source and a secondary winding connected to the other input circuit of said demodulator, and a direct-current responsive means in said output circuit of the demodulator.

2. A system as in claim 1 in which the effective magnitude of said resistance means is variable to correspond with the temperature of liquid in said cell.

3. A system as in claim 2 in which said resistance means is manually variable and provided with a temperature scale.

4. A system as in claim 2 in which said resistance means in part includes a temperature-sensitive resistor subjected to the same temperature changes as said conductivity cell.

5. A system for measuring the specific conductance of a liquid within a range having a preselected maximum comprising a conductivity cell, resistance means whose effective magnitude is variable to correspond with the temperature of liquid in said cell, a voltage-regulating power transformer having a primary winding for connection to an alternating-current source and a secondary winding connected to apply its constant alternating output voltage to said conductivity cell and said resistance means in series, a signal transformer having its primary winding connected in parallel to said resistance means to produce across its secondary winding an alternating signal voltage of magnitude varying as a linear function of the cell-current traversing said resistance means, a demodulator network having input circuits respectively supplied from said alternating-current source and said secondary winding of the signal transformer to produce a direct-current voltage of magnitude which varies as a non-linear temperature-compensated function of the conductance of liquid in said cell, and a measuring circuit to which said direct-current voltage is applied including a direct-current responsive means calibrated in terms of conductance and a variable resistance in series therewith to adjust the ratio between the direct current traversing said responsive means and the alternating current traversing said cell to a value for which the conductance calibration of said responsive means matches the actual cell-conductance at between 75% and 85% of the maximum conductance of said range.

6. A system for measuring the conductivity of a solution subject to temperature variation comprising a conductivity cell for containing said solution, resistance means whose effective resistance is adjustable to values corresponding with different temperatures of said solution, means for applying an A.C. voltage of stable magnitude to said cell and resistance means in series to produce across said resistance means an A.C. voltage which is a non-linear temperature-compensated function of the conductance of said cell, a signal transformer having a primary winding connected across said resistance means, demodulator means energized by the output of said signal transformer and by an A.C. voltage of fixed magnitude and of the same frequency as said A.C. voltage applied to the cell to produce a direct-current voltage which is a direct current reproduction of said non-linear temperature-compensated function of cell conductance, and a measuring circuit excited by said direct-current voltage including a meter calibrated in terms of conductance and a series-resistance adjustable to set the ratio between the A.C. current traversing said cell and the D.C. current traversing said meter in minimization of the difference between the indicated conductance and the actual conductance.

7. A system for measuring the conductivity of a liquid comprising a conductivity cell, resistance means; a voltage-regulating power transformer having a primary winding for connection to an alternating-current source and a secondary winding connected to apply its constant alternating output voltage to said conductivity cell and said resistance means in series; a demodulator network comprising a first pair of resistors connected in series between a pair of input terminals, a second pair of resistors connected to a pair of output terminals, and a pair of transistors having their emitters respetcively connected to said output terminals, their bases connected to said input terminals and their collectors connected to the common terminal of said first pair of resistors; a signal transformer having a primary winding conected across said resistance means and a secondary winding connected between the common terminals of said two pairs of resistors; a second power transformer having a primary winding for connection to said alternating-current source and a secondary winding connected to said input terminals of the demodulator network; and a direct-current responsive means calibrated in terms of conductance and connected to said output terminals of the demodulator network.

References Cited in the file of this patent
UNITED STATES PATENTS

| | | |
|---|---|---|
| 2,422,873 | Wolfner | June 24, 1947 |
| 2,897,436 | Douty | July 28, 1959 |

OTHER REFERENCES

Recording Conductometer for Electrolytes, by Ashman et al., pp. 710–715, published in Instruments, vol. 24, June 1951.